Sept. 9, 1947.　　　　　R. M. HETTINGA　　　　　2,427,103
CONTROL
Filed April 6, 1945　　　　　6 Sheets-Sheet 1

INVENTOR
RALPH M. HETTINGA
BY
ATTORNEY

Sept. 9, 1947.  R. M. HETTINGA  2,427,103
CONTROL
Filed April 6, 1945  6 Sheets-Sheet 2

INVENTOR
RALPH M. HETTINGA
BY
ATTORNEY

Sept. 9, 1947. R. M. HETTINGA 2,427,103
CONTROL
Filed April 6, 1945 6 Sheets-Sheet 3

INVENTOR
RALPH M. HETTINGA
BY
ATTORNEY

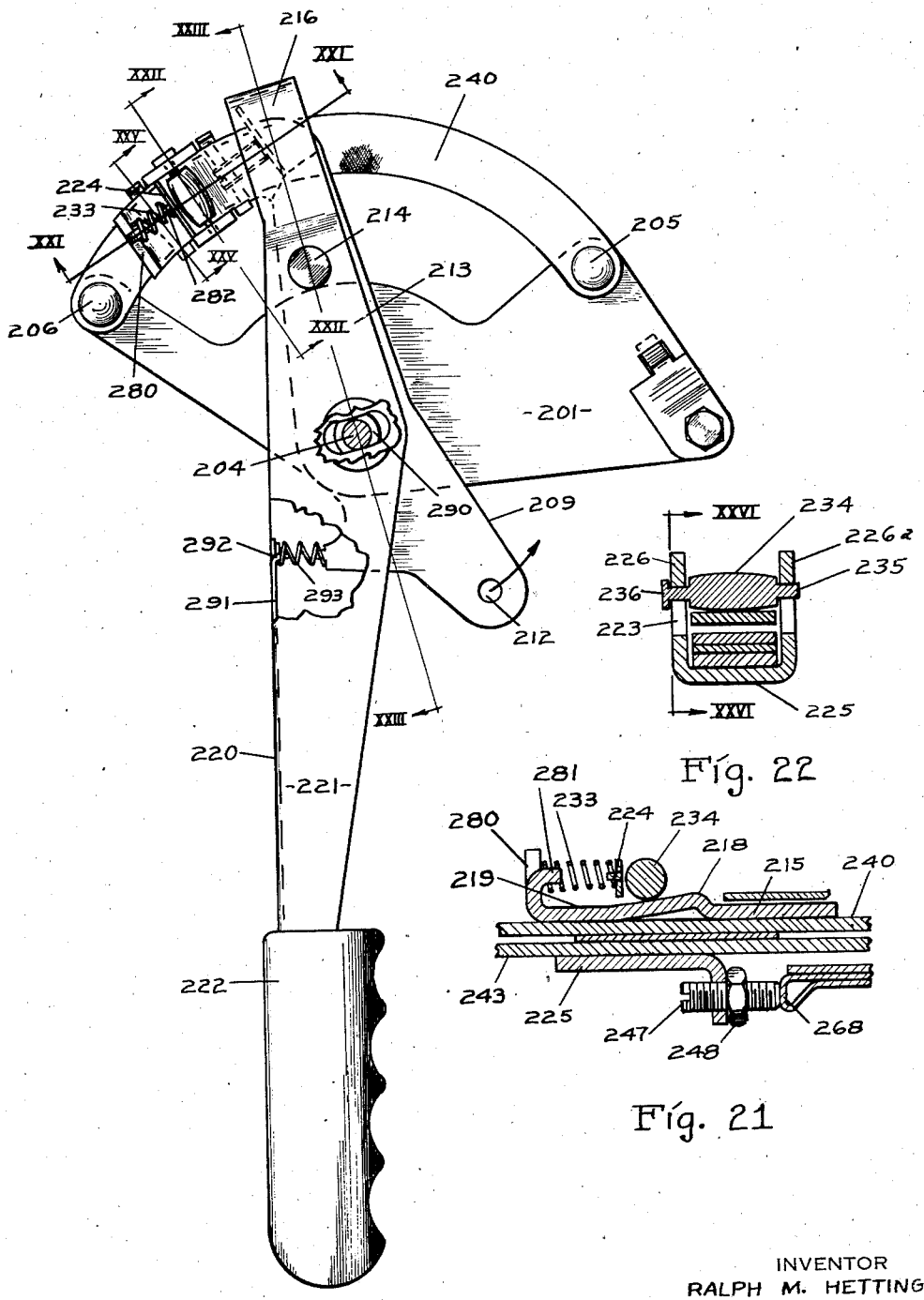

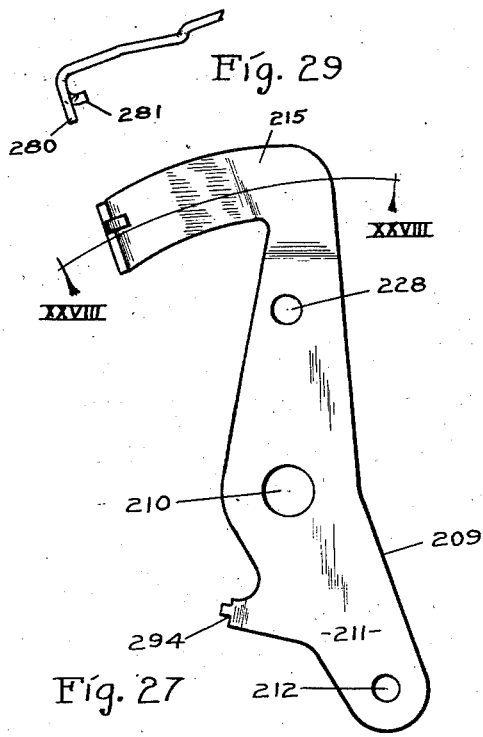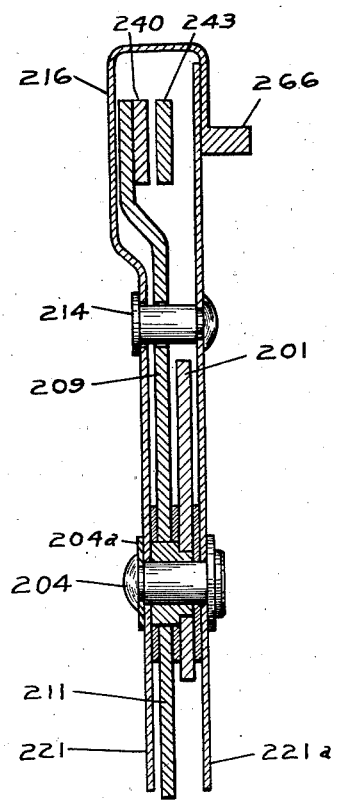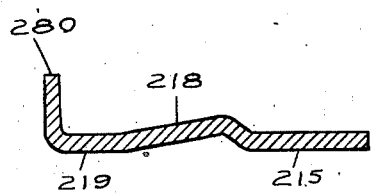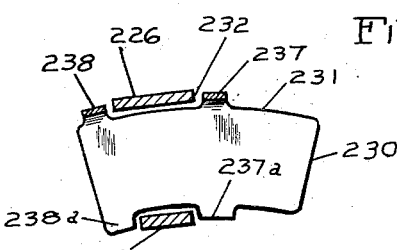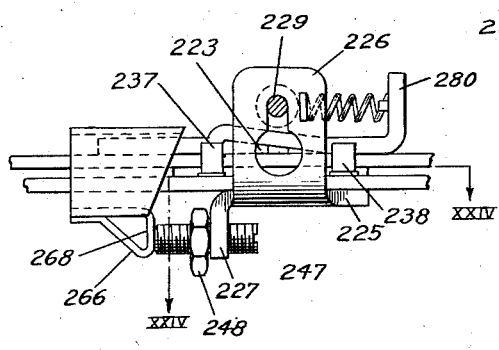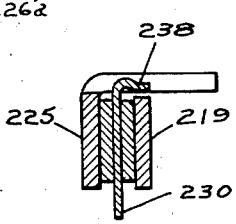

Patented Sept. 9, 1947

2,427,103

UNITED STATES PATENT OFFICE 2,427,103

CONTROL

Ralph M. Hettinga, Kalamazoo, Mich.

Application April 6, 1945, Serial No. 586,855

15 Claims. (Cl. 74—531)

This invention relates to a device for holding in relatively fixed position a member subjected to a constant or intermittent load and particularly relates to a frictional device of this type which may be moved freely in response to an adjusting force, either with or against said load, but will grip solidly and firmly immediately upon removal of said adjusting force.

The subject matter of this invention is applicable to a large variety of mechanical situations. However, since the problem solved thereby first came to my attention with respect to aircraft fuel controls, it will hereinafter be illustrated and described with particular reference thereto, although other possible applications of the mechanical principles involved will also be illustrated and described.

On many types of airplanes, both large and small, there are one or more means for making adjustments within the engine, among which means is the throttle lever. In such a lever it is necessary both that it be easily and quickly movable at the will of the pilot, and that when placed in a desired position it will stay there without moving until the pilot desires to make a further adjustment. While in many airplanes, particularly small ones, this has been accomplished in the past by causing the lever to operate between spring loaded friction plates, or by other purely frictional means, such has been only partially satisfactory. On larger planes where the vibration and/or the loads on the control cable are substantially larger, such means have not been satisfactory. Designers have attempted to solve this problem for larger planes by using various kinds of ratchet, or rack, and pawl devices. These are a substantial improvement over the mere friction loading of the lever, as above mentioned, but they still do not solve the problem, particularly in that a pawl will sometimes jump one or more notches when the lever is first released, and it will especially do so when the parts become worn. This results in the lever failing to stay in the position selected by the pilot and it is accordingly not satisfactory.

This same problem applies on a broad scale to all levers which are desired to be held in a selected position under a load.

It is desirable, therefore, to provide means which will hold a lever, or other control mechanism, in any selected position against a constantly applied force which can be at will readily moved in either direction toward or against said applied force, and which will grip suitable fixed means solidly and quickly, upon release of a force used to move the controlling means for adjustment thereof, and hold same securely in its adjusted position. Further, it is desirable to provide means as aforesaid having no operating mechanism extending from the handle of the lever, or other control means, to the gripping means, such as the releasing handle and rod on a spring loaded pawl. This is in order that the length of the control handle may be freely changed to suit individual needs without changing the holding means. It is further desirable to avoid using a pawl in order to provide quicker and easier action by eliminating the necessity of first releasing a pawl when the lever is to be moved.

Accordingly, the principal object of my invention is to provide a method and means for holding a controlling mechanism in a selected position against either a constantly applied or an intermittent load.

A further object of my invention is to provide a method and means as aforesaid wherein smooth adjustment may be made of the control means while under load whether constantly applied or intermittent, from one selected position to another.

A further object of my invention is to provide a method and means as aforesaid wherein the control means after adjustment will lock in its new position with a minimum of slippage.

It is a further object of my invention to provide a method and means for holding a control mechanism in a selected position which will hold tightly in any of an infinite number of possible positions.

It is a further object of my invention to provide a method and means for holding a control mechanism in a selected position wherein the locking force can be released gradually as a controlling force is applied and wherein the locking force will be applied progressively as the controlling force is released in whatever position the control mechanism may then occupy.

It is a further object of my invention to provide a method as aforesaid wherein the means required for practicing same are sturdy and reliable and not readily subject to breakage or damage.

A further object of my invention is to provide a method as aforesaid which can be practiced by means and not greatly subject to wear, and in which when wear does occur appropriate compensation can easily be made.

A further object of my invention has been to provide a method as aforesaid which can be practiced by means inexpensive to manufacture and to maintain, and to provide such means.

Other objects and purposes of my invention will be apparent to one acquainted with the subject matter thereof upon inspection of the following specification and accompanying drawings, for it is believed that the underlying principle of my invention is of broad application and capable of many desirable uses.

In the drawings:

Figure 20 is a side assembly view of a third embodiment of my invention.

Figure 21 is a section taken on line XXI—XXI of Figure 20.

Figure 22 is a section taken on line XXII—XXII of Figure 20.

Figure 23 is a section taken on line XXIII—XXIII of Figure 20.

Figure 24 is a section taken on line XXIV—XXIV of Figure 26.

Figure 25 is a section taken on line XXV—XXV of Figure 20.

Figure 26 is broken fragmentary side view of the holding mechanism appearing as part of the device shown in Figure 20, taken as a partial section on the line XXVI—XXVI of Figure 22.

Figure 27 is an individual view of the load lever of the embodiment shown in Figure 20.

Figure 28 is a section taken on the line XXVIII—XXVIII of Figure 27.

Figure 29 is a fragmentary view showing a detail of the load lever.

FIGURES 1 TO 11 INCLUSIVE

Figures 1, 2, 6, 8:
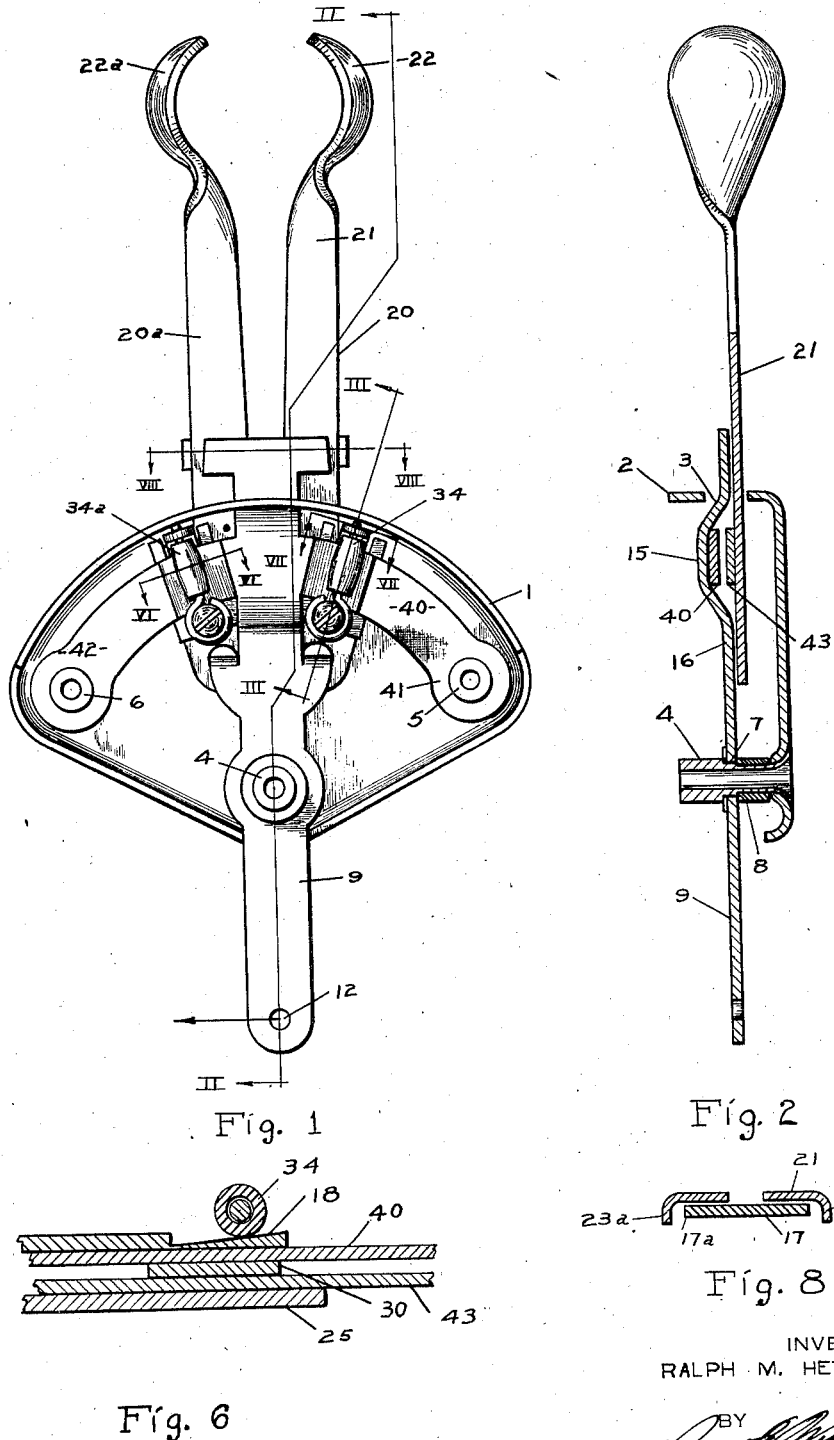
Figure 1 shows a side assembly view of one form of means for practicing the method of my invention.
Figure 2 is a section taken along line II—II on Figure 1.
Figure 6 is a fragmentary section taken along lines VI—VI of Figure 1.
Figure 8 is an enlarged section taken on line VIII—VIII of Figure 1.

Referring now to the specific embodiment illustrated in Figures 1 to 11 inclusive for one type of means illustrating the operation of my method, a detailed description of said means will first be given in order that said method as illustrated thereby will be better understood. This particular embodiment is a control lever for the throttle valve of an airplane, but may be readily applied to a wide variety of other uses. In the form of control lever so illustrated, the case 1 serves as a mounting frame and supports and guides the other elements. It is composed of a suitable back portion having top flange 2 forming a circular segment. Said flange has an opening 3 therein, and the back portion has suitably placed openings receiving the hereinafter mentioned pins. Extending through said openings in the mounting case 1 is the supporting pin 4 for the load lever 9, and the mounting pins 5 and 6 for the sector guide strips 40 and 43. These pins may conveniently have a portion 7 of reduced diameter for engaging the means mounted on them and a spacer 8 holding said means against the shoulder comprising the other portion of the pin. The pin is affixed to the mounting case 1 in any suitable manner, such as by spreading it in the manner of a hollow rivet, as shown in Figure 2.

The guide sector 40 is made from any material having high strength and high friction characteristics, such as a laminated phenolic. It conveniently has enlarged the ends 41 and 42 by which it is engaged by the pins 5 and 6. The guide sector 43 is identical with the sector 40. The pins 5 and 6 are substantially like the pin 4 but modified suitably to hold two members instead of one and to hold them in proper spaced relation, both with respect to each other and with respect to the back of the mounting case 1.

Since these lever units will normally be mounted in plurality to form a bank of controls, the pins 4, 5 and 6 are preferably hollow, as best shown in Figure 2, and are of length to form suitable spacer members, whereby two or more of these control units can be held together and mounted as desired by passing a bolt through each of said pins.

Figure 9:
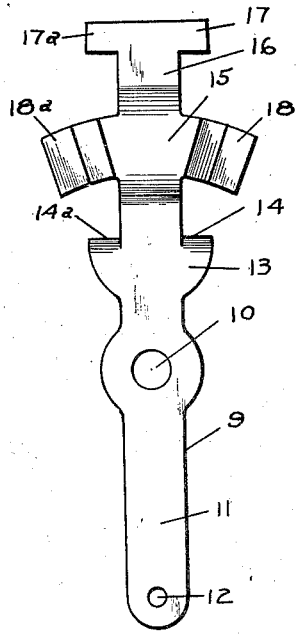
Figure 9 is an individual view of one of the elements known as the "load lever," used in the assembly shown in Figure 1.
Figure 7:
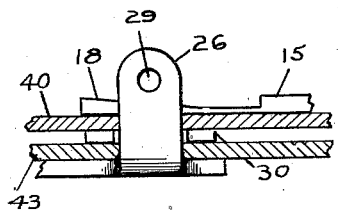
Figure 7 is a partial section taken on line VII—VII of Figure 1.

In Figure 9 there is shown a plan view of the load lever which comprises generally, in the form here shown, a pivoting means centrally located with holding means at one end and load engaging means at or near the other end. The load may, of course, be applied to any portion of the load lever that is convenient, such as between the pivot means and the holding means.

Figures 3, 4, 11:
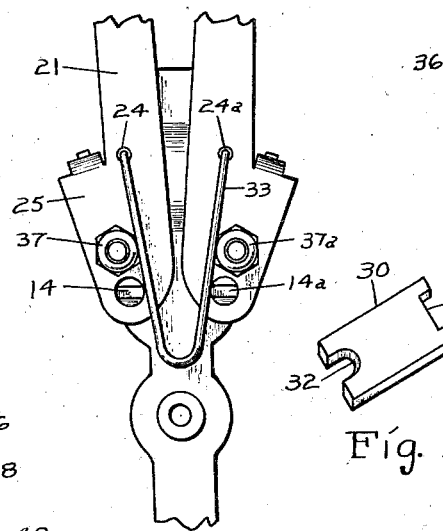
Figure 3 is a section taken on line III—III on Figure 1.
Figure 4 is a fragmentary view of the means illustrated in Figure 1 but with the back plate removed and looking at it in a direction opposite to that of Figure 1.
Figure 11 is an individual view of a friction plate used in the assembly shown in Figure 1.
Figure 5:
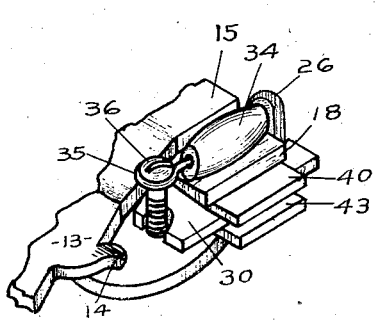
Figure 5 is a fragmentary oblique view of a portion of a locking mechanism of the means illustrated in Figure 1.

Looking now at the load lever 9 in more detail, it comprises first a mounting and pivoting opening 10 which receives the stop 7 of the mounting pin 4. From the central mounting portion there extends in one direction the arm 11 for any convenient distance and said arm has near its end suitable load engaging means, such as the opening 12 for receiving a wire or cable fastening. Extending in the opposite direction from the central mounting portion is the holding arm 16. Extending laterally from the holding arm and from a point closely adjacent the mounting opening 10, are a pair of arms 13 which are bent over at their ends 14 to form pivotal engaging means as best shown in Figures 3 and 4. Said holding arm 16 has a bent portion at 15 (best shown in Figure 2) enabling it to pass the sector 40. Extending sidewardly from said holding arm along an arc coinciding with the sectors 40 and 43 are suitable arms carrying wedges, or friction members, 18 and 18a. At the end of the arm 16 is a pair of sidewardly disposed extensions 17 and 17a which cooperate with portions of the release handles 20 and 20a as described below.

Figure 10:
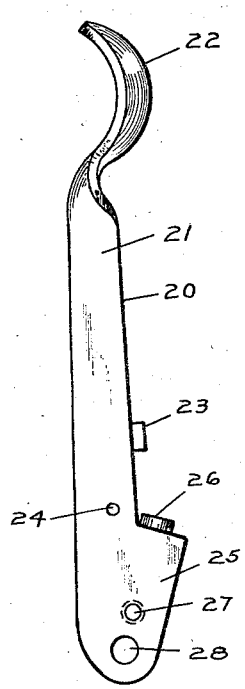
Figure 10 is an individual view of another of the elements known as the "operating lever," used in the assembly shown in Figure 1.

Turning now to Figure 10 there is illustrated the operating handle 20 appearing in the assembly shown in Figure 1. This handle has a shank 21 of any convenient length carrying manipulative means 22 of any convenient form but which are here shown for hand manipulation. At a point on the side of said handle there is an extending and bent over portion 23, best shown in Figure 8, for engaging the extension 17 of the load lever 9. An opening 24 is positioned substantially as a matter of choice within the shank 21 to receive one end of the spring 33 (Figure 4). This spring may be placed practically anywhere between the handles 20 and 20a that is convenient. Near the end of said operating lever opposite the handle 22 is an opening 28 for receiving the pivot member 14 of the load lever 9 (Figure 3), by which said operating lever is mounted on the load lever and is enabled to move pivotally with respect thereto. Extending sidewardly from the shank 21 near said pivot opening 28 is an extension 25 carrying a roller support member 26. This roller support is distant from the pivot opening 28 a distance sufficient to pass close by the upper side of the wedge arm 18 of the load lever 9, as best shown in Figure 3. The operating lever 20 also has a tapped opening 27 suitably positioned therein for receiving the anchor and adjusting bolt 36 as described in more detail hereinafter.

The other operating lever 20a is a mirror image of the operating lever 20, and is applied to the other side of the load lever in a manner corresponding to that above described for the lever 20.

The roller 34 is slightly tapered towards each end and is mounted for easy rotation on the roller pin 35. This pin is held at one end in the opening 29 of the roller supporting member 26 and by a loop at the other end which encircles the bolt 36. Said bolt extends through the threaded opening 27 of the operating lever and is held in place by the lock nut 37. Said bolt is adjusted and locked to hold the roller 34 closely against the wedge part 18.

The friction plate 30 (Figure 11) is a small flat rectangular plate having a rectangular cutout 31 at one end and a semi-circular cutout 32 at the other end. It is placed between the two sector members 40 and 43 (Figure 5) so that the roller supporting member 26 is received into the rectangular cutout 31 and the roller guiding bolt 36 is received into the semi-circular cutout 32.

This roller, its supporting and guiding mechanism and said friction plate are all duplicated in mirror image with respect to the operating lever 20a, and the whole assembled accordingly.

Operation

The foregoing described device assembled as therein directed and illustrated in the drawings, is mounted by bolts through the hollow pins 4, 5 and 6 to any suitable supporting means. The load cable, such as a spring opposed throttle control of an air-craft engine, is affixed to the lower end of the load lever 9 by any suitable means through opening 12. For the purpose of the following discussion it will be assumed the load operates leftward as indicated by the arrow leading from said opening 12 in Figure 1. However, insofar as the construction of this device is concerned it will operate equally well with the load directed in either direction, and is accordingly well adapted for handling a load including a high degree of vibration or even reciprocation.

Under these conditions the spring 33 (Figure 4) will urge the operating levers 20 and 20a apart, and in response to such urging said levers will pivot around the turned-over members 14 and 14a of the load lever 9. Since the roller carrying pin 35 is held by the roller supporting part 26 and support bolt 36 all of which are mounted on the operating lever 20, the roller 34 will move to the right (Figure 1) as said operating lever moves to the right. The friction plate 30 will move to the right with said roller. In so moving to the right the roller 34 moves upslope on the wedge 18 and a substantial force is developed perpendicular to the friction surfaces and is exerted through said parts against the sector members 40 and 43.

A mirror image of this action also takes place with respect to operating lever 20a and its associated parts.

Up to this point the movement of the operating levers has been assumed to be due only to the action of the spring 33. Therefore, it is obvious that it will not be particularly extensive or sufficient to exert a particularly great gripping force. It is, however, sufficient to cause all parts concerned to be held snugly together.

Now considering the effect of the load force acting to the left at the lower end of the load lever 9, this will tend to move the upper end of said load lever to the right. In so doing the wedge 18a will be jammed tightly under the roller 34a. Since the parts are already lying snugly together, a very slight actual rightward movement by the wedge 18a will be sufficient to cause a substantial tightening thereof and the creating of ample pressure by the parts associated with said operating lever 20a, perpendicular to and against the sector strips 40 and 43, to cause frictional gripping and holding thereof. This movement, while it exists, is barely discernible to the eye and of no materiality with respect to firm holding of the load. It will be noted that in the construction as shown, best illustrated in Figure 7, there are four friction surfaces acting in association with each operating lever. These may be multiplied to a considerable extent by the provision of more sectors corresponding to the sectors 40 and 43 and corresponding multiplying of the friction plate 30. However, a great load will be held by the construction as shown since the holding force will increase rapidly in response to an increase in the loading force.

While no direct holding will be obtained from the roller 34 and its associated mechanism with the loading force as indicated in Figure 1, where the attaching means is a rigid bar instead of a flexible cable and subject to some vibration so that the load may be variable or even reciprocating, then both sides will act to hold the load lever tightly against movement in either direction.

When it is desired to adjust the position of the load lever the operator grasps the handles 22 and 22a and squeezes them together a distance limited by the ears 23 and 23a acting against the extensions 17 and 17a. This movement of said operating levers pivoting on the pivot parts 14 and 14a respectively moves the rollers 34 and 34a mutually towards each other sufficiently to carry them off their respective wedges far enough to release the gripping forces created thereby. The levers may then be moved to any desired position with the operating levers holding rigidly the load lever at the latter's sideward extensions 17 and 17a and at the pivots 14 and 14a. When the levers have reached the desired new position they are released. The spring 33 opens them sufficiently to set the rollers in position for gripping and the load then immediately sets the acting roller for immediate and tight holding.

It will also be observed that when it is desired to make a quick adjustment, such as will often happen in aircraft operation, it is not necessary to grasp both levers, but it is necessary only to push the nearest operating lever in the desired direction. For example, if it is desired to move the operating levers as shown in Figure 1 leftward, then the operator merely pushes leftward on the handle of operating lever 20. This engages the ear 23 of the operating lever against the upper end of the load lever at its extension 17 and pushes it leftward. This pushes the wedge 18a out from under the roller 34a and thus releases the holding pressure. The mechanism is then pushed to the desired position and released whereupon it will act immediately in response to the load and resume its gripping position. The same operates correspondingly in the opposite direction.

Thus the operator may make desired adjustment quickly with a minimum of manual operation and with assurance that the device will hold itself firmly in any adjusted position under any load which the mechanism is structurally capable of withstanding, under either steady, variable, or reciprocating loads and in spite of a great amount of vibration. It will be observed also that the only parts which are particularly subject to wear, namely, the roller, the roller contacting face of the wedge and the several friction surfaces, will not wear materially even after extensive use and when they do wear it is a simple matter to compensate therefore by turning downward the roller supporting bolt 36 and correspondingly tightening the lock nut 37.

Although not here illustrated, the lock nut 37 will normally be safetied in any desired position, particularly when used in aircraft construction.

FIGURES 12 TO 18 INCLUSIVE

In Figures 12 to 18 inclusive there is illustrated an embodiment of my invention which is designed for use wherever the control handle is desired to move substantially on the same axis with the cable or other load carrying means. An example of this use arises with certain types of automobile parking brakes.

In the drawings hereinafter referred to it will be observed that the numerals applied thereto have been chosen to correspond, insofar as feasible, with the numerals used to identify the similarly functioning parts of Figures 1 to 11 inclusive, in order that the correspondence of these parts might appear more clearly.

A mounting member 101 comprising a fastening tab 102 and a body part 103 is suitably bolted to appropriate supporting means, such as the frame of an automobile. The body part 103 is rectangular in cross section and has frictional guide strips 143 and 144 fastened to it on its upper and lower surfaces. A third frictional guide strip 140 is suitably mounted above and parallel to the strip 143 and is spaced slightly from it. These strips are held in place by suitable bolts and spacer means.

Figure 16:
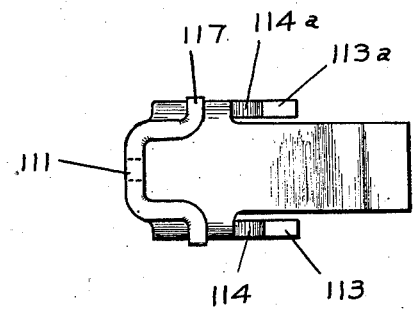
Figure 16 is a top view of the element shown in Figure 15.
Figure 15:
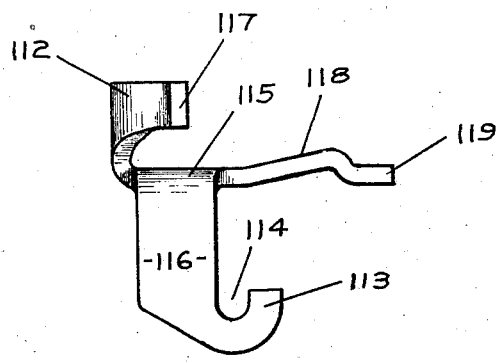
Figure 15 is an individual side view of the load member of the embodiment of Figure 12.

In this embodiment the load carrying member is illustrated in Figures 15 and 16. From a central section 115 there extends downward from each side thereof a guide member 116 and from each guide member there extends downward and rearwardly the pivot engaging members 113 and 113a. Extending rearwardly from the central section 115 is a part made from suitably strong material bent to form a wedge 118 and then bent again to form a wedge supporting foot 119 which is located in the same plane as the central section 115.

From the forward portion of the said central section 115 there extends vertically a cable receiving member 112 having a cable opening 111 therein. From this cable receiving member 112 there extends rearwardly a pair of wing members, one from each side thereof, which latter at their reaward extremities are bent sidewardly and outwardly to form the ears 117.

This load carrying member rides on the upper surface of the friction strip 140 and its depending guide members 116 extend downwardly on each side thereof. The loaded cable or rod is fastened operatively to the cable carrying member 112.

Figure 17:
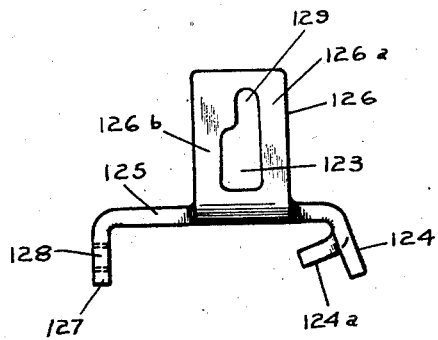
Figure 17 is a side view of the roller supporting element of the embodiment shown in Figure 12.

The roller retaining member is illustrated in Figure 17. This has a flat rectangular body portion 125 from which extend upwardly a pair of roller retaining members 126, one on each side of said body part 125. In each of said roller retaining members 126 is a central opening having a relatively small part 129 for receiving, guiding and retaining one end of the roller shaft, and a relatively larger part 123 for purposes appearing hereinafter.

Depending from the forward end of the body portion 125 is an adjusting bolt supporting member 127 having a tapped opening 128 therethrough. Angularly depending from the rearward end of said body part 125 is a spring backing member 124 having cut out therefrom and turned inward the spring holding tab 124a.

The central body part 125 of this roller retaining member rests by its upper surface against the bottom surface of the friction strip 144. It is held in place with respect thereto by the roller 134, which rests on the wedge 118 and by the extension of its shaft through the opening 129 on each side holds said roller retaining member in position.

Figure 12:
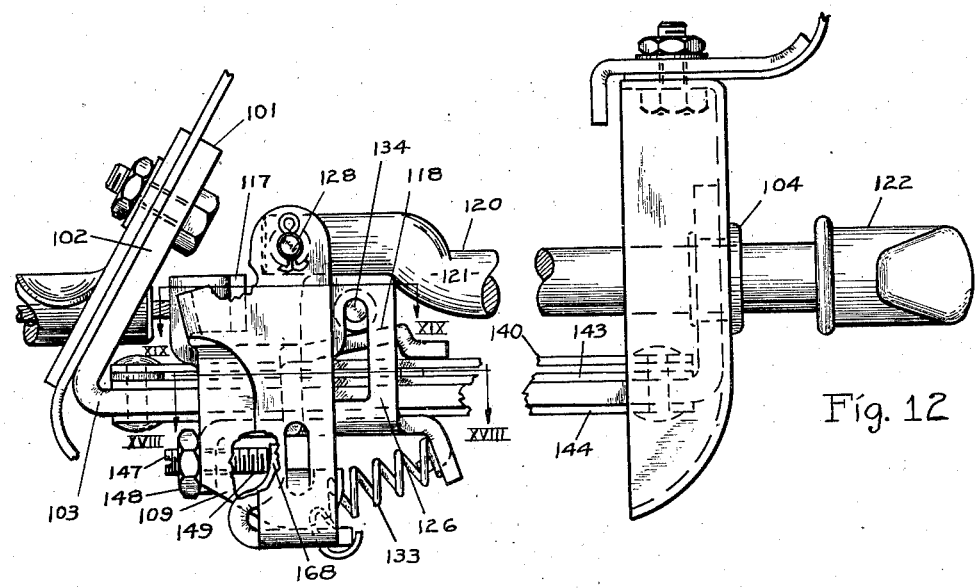
Figure 12 is a broken assembly view of another embodiment of my invention.
Figure 19:
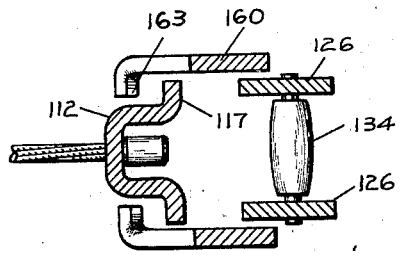
Figure 19 is a section taken on line XIX—XIX of Figure 12.
Figure 14:
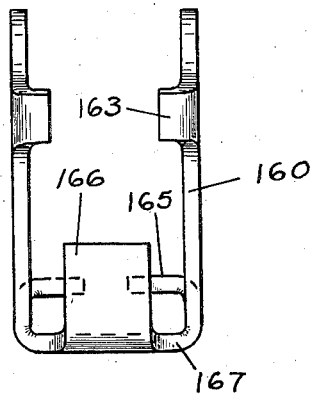
Figure 14 is an end view of the operating lever shown in Figure 13.
Figure 13:
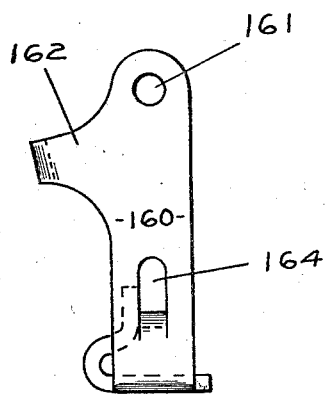
Figure 13 is an individual view of one of the operating levers in the embodiment shown in Figure 12.

The release or operating lever is illustrated in Figures 13 and 14. From a flat central portion 167 there arises vertically on each side thereof the side members 160. At the upper end of each of said members is an opening 161 for receiving the fastening pin 128 (Figure 12) by which the handle connecting bar 120 is operatively connected to the operating lever. Extending forwardly from each of said side members 160, and near the top of each thereof, is an arm 162 having at its extremity a bent over pulling lug 163. These lugs are in such positions, when all parts of this device are associated for operation, that they will each engage one of the ears 117 (Figure 15) of the load carrying element. Near the lower portion of each of said side members 160 is a stamped out and bent inward pivot member 165. These pivot members are located so as to pass through the openings 114 and 114a of the load carrying member, whereby the operating lever can pivot with respect thereto. Extending forwardly and upwardly from the central body portion 167 is a member 166 which as shown in the central broken area of Figure 12 presents a bearing part 168 in position to contact the bearing end 149 of the adjusting bolt 147. It will be observed that the bolt contacting part of the bearing member 168 is slightly above the pivot members 165. This is so that when the release handle 122 is pushed leftward, as seen in Figure 12, to push leftward the upper end of the release lever, said bearing portion 168 will act under considerable mechanical advantage to push forward the adjusting bolt 147 and thereby push forward the roller 134. This will move said roller forward off from wedge 118 and thereby release the gripping action thereof in order that the entire device may move forward easily under the urging of the control rod 120.

As appears in Figure 12, one end of the coil spring 133 surrounds the spring holding tab 124a and is held by it on the spring backing member 124. The other end of the coil spring 133 is affixed in any convenient manner to the central section 167.

Figure 18:
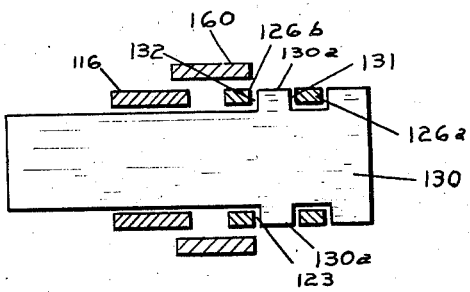
Figure 18 is a section taken on line XVIII—XVIII of Figure 12.

The friction plate is illustrated in Figure 18. This operates similarly to the friction plate in the first described embodiment and obviously may be multiplied in number along with corresponding multiplication of the friction strips 140 and 143 if greater frictional gripping capacity is required for any particular installation. As shown, and for most practical purposes, a single friction plate 130 will be sufficient.

This friction plate is a generally rectangular plate of no greater thickness than necessary to secure reasonable stiffness, and which, in its narrow portions, corresponds to the width of the friction guide strips. Said narrow portions are provided by cutting into the sides of a rectangular blank the notches 131 and 132. Notch 131 is of width sufficient to receive the part 126a of the roller retaining member. The space between said notches 131 and 132 is sufficient to provide a lug 130a extending into the opening 123 of the roller retaining member. The notch 132 extends from the leftward end of the lug 130a to the leftward of said friction plate 130. Along its sides are positioned, as shown in Figure 18, the forward portion 126b of the roller retaining member, the depending sides 116 of the load carrying member and the upwardly extending side 160 of the operating lever. This figure will accordingly illustrate further the mutual relationship and positioning of the various parts.

*Operation*

In any position of the above described device along the supporting bar 103 and the associated friction strips with no backward, or rightward, pressure being applied to the control handle 122, the action of a forwardly, or leftwardly, applied load will cause a firm and steady gripping by the parts of this device against said friction strips which will be entirely reliable and not subject to slipping.

The forwardly acting load force being affixed to the load carrying member 112 will act to pull the wedge 118 in a forward direction. There being no direct, or immediate, connection between the said wedge and the roller retaining member, there is no corresponding force tending to move the roller forward at the same time. In fact, the frictional contact of the upper surface of its body portion 125 against the lower surface of the friction strip 144, will tend to hold said roller retaining member against forward movement. Therefore, since the roller is already in contact with the upper surface of said wedge 118, it will quickly tighten thereagainst and apply a force of considerable magnitude perpendicularly through the various members having friction surfaces contacting the guide strips. These surfaces will, of course, be (1) the lower surface of the central member 115 and the foot 119 of said load carrying member, (2 and 3) both surfaces of the friction strip 130 and (4) the upper surface of the central member 125 of the roller retaining member. With the roller held in close contact with the wedge 118 at all times this tightening will take place with a very slight, practically indistinguishable, forward movement of the load carrying member. Such forward movement as does occur will, for all practical purposes in a device such as an automobile hand brake, be of no importance.

As the above described device is placed in any position along the carrying bar 103 without any loading or other forces acting upon it, the spring 133 will urge the roller retaining member in a backward direction relative to the operating lever. Since said operating lever is connected through the pins 165 to the parts of the load carrying members surrounding the partial openings 114 and 114a, it follows that the roller carrying member will be urged backward with respect to the load carrying member and the associated wedge 118. Therefore, the roller will be urged backward along the wedge sufficient to cause it to fit snugly thereagainst, although this spring will not be strong enough to cause any real gripping by reason of its action alone.

When it is desired to move the controlling cable against the force, as moving the brake handle backward to set the parking brake, the handle 122 is grasped manually and pulled backward, thus applying a rightwardly acting force through the bar 120 and the pin 128 to the top of the operating lever. Said lever moves on its pivot pins 165 with respect to the load lever through the pivot openings 114 and 114a until its bent over pulling lugs 163 engage the ears 117 of the load carrying member. The pulling force applied to the handle 122 is then transmitted directly through the handle bar 120, through pin 128, the forwardly extending arms 162 and their associated pulling lugs 163 to the ears 117, and the connected parts of the load carrying member, to the control cable which it is desired to move. When the desired adjusted position is attained the pulling force applied to the handle 122 is terminated and the force on the control cable is allowed to set the gripping mechanism as above described.

When it is desired to move the controlling mechanism in the direction of the applied force, such as releasing the setting of the automobile parking brake, then a manual force may be applied to the handle 122 in a leftward direction as the same appears in Figure 12. This acts through the pin 128 to move the upper end of the operating lever leftward. Said operating, or release, lever pivoting on its members 165, as held in the openings 114 and 114a, causes the bearing member 168 to move forward under a considerable mechanical advantage inasmuch as the distance from the operating center of said bearing member to the center of the pivot is relatively small. This operates against the end 149 of the adjusting bolt 147 to push the roller retaining member forward and thus move the roller 134 sufficiently off from the wedge 118 to release the gripping force. With said gripping force released, the whole mechanism will move forward so long as a forwardly urging force is being applied to the handle 122 of sufficient magnitude to follow the movement of the whole device as it moves forward under the pull of the load cable and hold the roller 134 ahead and off of the wedge 118. As soon as said force is removed, the load force operating against part 112 of the load carrying member will again set the mechanism in gripping position as above described.

It will thus be seen that the load carrying cable may be freely pulled backward or pushed forward at the will of an operator without the necessity of releasing catches or pawls of any sort, and yet upon the termination of the adjusting force it will immediately grip itself and remain firmly in any selected position.

It will be observed also that there are no finely machined or closely adjusted parts or points to wear out, and that any slight wearing which does occur can be readily compensated by the adjustment of the nut 148 on the bolt 147. Hence, this device can be relied upon to last a long time under heavy and continuous use without the necessity of repairing or replacing any of its parts.

FIGURES 20 TO 29 INCLUSIVE

In Figures 20 to 29 inclusive there is illustrated an embodiment of this invention designed for operation in association with a force of considerable magnitude, such that the direct pull of the preceding described and illustrated form is not desirable and the mechanical advantage of a lever action is needed. Accordingly, in general this embodiment will be characterized by a relatively heavy construction throughout and by a manually operated lever which has no operating part between its handle and the gripping means, such as is common with the ratchet and pawl type used for similar purposes. It is, also, designed for use with a mechanism having only a one way pull and little or no vibration, as distinguished from the conditions under which the first above described embodiment is designed to operate, although the pull may vary substantially in magnitude to the point of becoming almost intermittent. For the purposes of description, this embodiment will be assumed to be an automobile hand brake wherein the rightward side as appearing in Figure 20, will be denoted "forward" and leftward side will be denoted "rearward."

Referring to Figure 20, a frame member 201 supports a plurality of sectors, here shown as two, namely, the sector guide strips 240 and 243 which as in the embodiment of Figure 1 are of any strong high friction material, such as a laminated phenolic. This frame member 201 is suitably mounted on appropriate supporting means and constitutes the basic mounting means for the rest of the mechanism. Suitable bolts or rivets 205 and 206 fasten the sector guide strips to the frame 201.

Pivotally mounted by a pivot pin 204 onto the frame 201 is the load lever 209 which is shown in more detail in Figures 27, 28 and 29. Like the embodiment illustrated in Figure 1, this load carrying lever is pivoted between its ends, carries load engaging means 212 at its one end and the roller engaging wedge 218 at its other end. However, also like the form shown in Figure 1, the load may be applied anywhere on the load lever although here it must be in the proper direction for holding. The body part 215, of which the wedge 218 is a part, extends sidewardly from one extremity of the load carrying lever 209 and is placed and shaped to coincide with the sectors 240 and 243 in all positions of the load lever around the pivot point 210. This member contacts the sector strip 240 by its body part 215, it then bends to form the wedge 218 and returns to contact with said sector to form a foot 219. From the extremity of this foot, however, there is bent upward a stop portion 280 from which there is cut and bent out a spring engaging member 281. Extending sidewardly from the lower arm 211 of the load lever 209 is a small arm having a spring engaging means 294 for purposes hereinafter to be described.

This load lever, pivoted at its opening 210 by pin 204 as above indicated, lies on top of the sector strip 240 as the same appears in Figure 20.

Referring now to Figures 21, 22 and 26, there is shown, among other things, the roller retaining member which is almost identical with the similar member shown in Figure 17. It has a central body part 225 and upwardly extending roller receiving members 226 and 226a placed at each side of said central body part 225. From the forward end of said central body part there turns downwardly a bolt supporting tab 227 which is suitably tapped for reception of the adjustable bolt 247. Said bolt is locked in adjusted position by the lock nut 248, and may be safetied if desired.

This roller retaining member is located on the underside of the sector 243 and its two arms 226 and 226a extend upwardly on either side of said sectors to a point above the wedge 218 portion of the load lever. The roller 234 may be mounted on a suitable shaft or made with integral hubs as shown. It is held within the opening 229 on either side of roller supporting members 226 and 226a (Figure 22). Sprung into suitable openings in the roller supporting members is the spring supporting member 224, having a cut and bent out portion 282 which, in cooperation with an aligned spring engaging member 281, supports and guides a small coil spring 233.

The friction plate 230 (Figure 24) is, like in the other embodiments, made of relatively thin but reasonably stiff material, is rectangularly constructed on a center line coinciding with the center line of the sectors 240 and 243 and has notches 231 and 232 cut into its sides forming recesses for the engagement of the roller holding parts 226 and 226a of the roller retaining member. In the case, however, of the lugs 237 and 238, they are here made long enough, as shown in Figure 25, to bend upwardly to contact and be guided by the central portions 215 and the foot portion 219, respectively, of the load lever. The lugs 237a and 238a engage the opposite side member, 226a.

The operating lever 220 comprises an operating arm 221 and an operated arm 213. It is mounted pivotally with respect to the load lever 209 by the stud 214 and has the longitudinal slot 290 surrounding the pivoting stud 204. This lever is formed in two sheets (best shown in Figure 23) of which one passes above the associated parts and the other passes below them and forming a head 216 passing round the sectors 240 and 243. A suitable portion 291 (Figure 20) of this lever has a bent down part 292 which is aligned with the spring engaging means 294 along an arc from the center of the pivot point 214. A coil spring 293 is held between these elements for purposes appearing hereinafter. A handle 222 or other operating means is applied to the operating end of said lever. A member 266 extends sidewardly from the head 216 of the release lever 220 and includes the bearing member 268 which in one part of its operating cycle contacts the bolt 247, as best shown in Figure 26.

*Operation*

Without any load on the device, the spring 293 will act to hold the lever 220 in its full rearward, or leftward, position with respect to the slot 290, as the same appears in Figure 20. The spring 233, acting against members 280 and 224 pushes the roller carrying arms 226 and 226a, and consequently the roller 234 carried thereby, upslope with respect to the wedge 218 and thus continuously holds the roller closely against the wedge. This spring is not strong enough to provide any real gripping action, but it should be strong enough to follow all movements of the roller positively and hold the roller always against the wedge.

With a load applied at the attachment opening, and acting in the direction of the arrow appearing thereat in Figure 20, the load carrying lever is urged in a direction to move its upper end leftward, or rearward. This, as best seen in Figure 21, urges the wedge 218 under the roller, causing same to tighten all of the associated mechanism together and bind the friction surfaces of the sliding parts tightly against the respectively contacting surfaces of the sectors 240 and 243. These friction surfaces referred to are the lower surface of parts 215 and 219 of the load lever, both sides of the friction plate 230 and the upper side of the central member 225 of the roller retaining part. The roller already being tight enough on the wedge to cause a small amount of friction to exist between the central part 225 of the roller retaining member and the friction strip 243 contacting it and between the friction plate 230 and the contacting surfaces of the sector strips 240 and 243, and there being no direct connection between the load lever and the roller supporting member, there will be no tendency for the roller and its supporting member to move leftward in the same direction as the upper end of the load lever. Instead, the roller will tighten against said wedge to provide a strong force perpendicular to the said friction surfaces, thus providing a strong gripping action to hold the entire mechanism tightly against movement.

When it is desired to move the lower end of the load lever against the load, as in tightening the emergency brake of an automobile, then the handle 222 is moved leftward as it appears in Figure 20. The rightward end of the slot 290 being already against the pin 204, by action of the spring 293, the operating lever will pivot around the stud 204 to act through the stud 214 directly against the load lever to move its upper end forward and the lower end backward against the load applied thereto. As the upper end of said load lever is moved forward it tends to pull the wedge out from under the roller 234. Since there is no direct or positive connection between the roller and wedge and their mutually related parts, the parts will yield to this tendency sufficiently to release the gripping action and the mechanism will move smoothly and easily along the sector guide strips 240 and 243, moving the lower end of the load lever 209 rearward against the load as far as desired and with whatever mechanical advantage is provided by the relative lengths of the two levers. As soon as the leftward, or rearward, acting force is removed from the handle 222, the load continuing to act on the lower end of the load lever will push the wedge 218 rearward under the roller and the device will grip tightly as before. Since the greater the load is the more tightly the friction surfaces will grip, the mechanism as shown will withstand a considerable loading. If greater gripping force is needed, it is evident that the sectors 240 and 243 may be multiplied to whatever extent needed and the friction strips 240 multiplied accordingly.

When it is desired to move the lower end of the load lever 209 in the same direction as the applied load, as in releasing the emergency brake of an automobile, then it is necessary only to apply a force to the handle 222 in the rightward direction as the same appears in Figure 20. As such a force is applied, due to the existence of the slot 290 which is held by the spring 293 with its rightward extremity against the stud 204, this lever will pivot first around the stud 214 with respect to the load lever. Thus, the sideward extension 266 and its bearing part 268 (Figures 21 and 26) will move slightly leftward with respect to the adjacent parts 215 and 218 of the load lever. This will push against the bolt 247 and thus move the roller supporting member leftward slightly and sufficiently to move the roller 234 away from its gripping relationship with the wedge 218. Although this movement will not be great, it will be sufficient to release the gripping force by the time the operating lever 220 has moved to apply the leftward end of the slot 290 against the stud 204. When this limit is reached, the load lever 209 and the operating lever 220 will move as a unit, along with their associated gripping parts to whatever new position is desired. When this position is reached and the rightward acting force removed from the handle 222, the load acting at 212 on the load lever 209 will again set the gripping mechanism in a firm and reliable frictional engagement with the sector strips 240 and 243.

As in the foregoing described embodiments, there is little wear so that repairs and replacements will be at a minimum. What small amount of wear does occur can be readily compensated by adjustment of the bolt 247 and correspondingly adjustment of the lock nut 248.

It will be observed that in all of these illustrated and described forms the basic principle has been to attach an operating lever to a shiftable roller in such a way that when no force is being applied to such lever, the acting load will urge a relative movement between a wedge and the roller by which the roller is moved upslope with respect of the wedge, and thereby cause a tightening and gripping between it and other associated means against a fixedly mounted strip. When a force is applied to the said operating lever, then an opposite relative movement between the wedge and the roller is caused, moving the roller downslope with respect to the wedge and releasing the gripping association of the wedge and associated parts with the fixedly mounted strip, and thus permitting the parts to move together along the said strip to their new position.

In all of the forms illustrated and described foregoing, the coacting friction surfaces are, when the control is in non-moving position, held together by a force developed by the wedge and roller in a direction perpendicular to said surfaces. By providing sufficient of said surfaces it will be evident that any required locking force can be readily provided without any loss in smoothness of operation or positiveness of control.

Many other variations and modifications will be evident to one acquainted with this type of mechanism upon a study of my disclosure as herein presented by these, and especially those above specifically mentioned, will all be included within the scope of my hereinafter appended claims excepting as they may expressly provide otherwise.

I claim:

1. In means for releasably holding a relatively movable element subjected to a force in a selected relatively fixed position, the combination comprising: a plurality of guide strips in stacked and spaced relation to each other; a load member including a wedge contacting slidingly a surface of one of said guide strips and movable in response to movement of said relatively movable element; a U-shaped member contacting in its mid-section a surface of one of said guide strips opposite the foregoing named surface and supporting a roller cooperating with said wedge; a plate intermediate a pair of guide strips lying between said wedge including member and said U-shaped member and said plate having portions engaging cooperating portions of said U-shaped member holding said plates against movement longitudinally of said guide strips independent of said U-shaped member; means responding to the will of an operator operatively connected with said U-shaped member for moving same longitudinally of said guide strips with respect to said load member; means operatively associating said load member with said relatively movable element.

2. In means for releasably holding in a selected fixed position a movable element subjected to a force, the combination comprising: a load lever pivoted at a point; means operatively connecting said movable element to said load lever; an arcuate member having its center line on an arc described from said point; a portion of said load lever comprising a wedge slidingly contacting said arcuate member; an operating lever pivoted with respect to said load lever at a point intermediate the arcuate member and the pivot point of said load lever; a roller supporting means carried by said operating lever and holding a roller in such cooperating position with respect to said wedge that a load imposed on said load lever will urge said roller upslope with respect to said wedge and hold same in frictionally engaging relationship against said arcuate member.

3. In means releasably holding in selectively fixed position a movable element subjected to a force, the combination comprising: a load lever pivoted at a point; means operatively connecting said movable element to said load lever; a relatively fixed arcuate member having its center line on an arc described from said point; a pair of oppositely sloped wedges slidingly contacting said arcuate member and associated with said load member for movement therewith; a pair of operating levers each pivoted with respect to said load lever at a point between a wedge and the pivot point of said load lever; means associated with each of said operating levers holding, respectively, wedge engaging means in operative position against each of said wedges and movable with said operating lever, whereby when said operating levers are urged in a direction to move their respective wedge engaging means upslope with respect to said wedges the load lever will resist movement of itself about its pivot point and when said operating levers are urged in a direction that their respective wedge engaging means move downslope with respect to said wedges the load lever can move freely about its pivot point.

4. In means releasably holding in a selected fixed position a relatively movable element subjected to a force, the combination comprising: a load lever pivoted at a relatively fixed point, means operatively associating said movable element and said load member; a guide strip positioned on an arc described about said point; a pair of wedge elements contacting said guide strip and associated with said load lever for movement therewith along said strip; a pair of operating levers pivoted to said load lever at points respectively between each of said wedge elements and the pivot point of said load lever, and wedge engaging means carried by each operating lever cooperating with each of said wedge elements carried by said load lever for selectably holding said load lever immovable about its pivot point, said last mentioned means being each releasable by movement of the operating lever with which it is associated; stop means limiting the movement of said operating levers with respect to said load lever at a point close to the release point of said wedge engaging means and firmly holding said load lever for integral movement therewith about the pivot point of said load lever.

5. In means holding a movable element subjected to a force in a selected fixed position and releasing same and moving it to another selected fixed position at the will of an operator, the combination comprising: a load carrying lever pivoted at a point; means operatively associating said movable element with said load lever; at least one guide strip arranged along a center line comprising an arc described about said point; a member associated with said load lever contacting one surface of a guide strip in sliding relation thereto and including a wedge; a U-shaped member contacting an oppositely facing guide strip surface and holding wedge engaging means in operative position with respect to said wedge; an operating lever pivoted to said load lever at a point between said guide strip and the pivot point of said load lever one portion of said operating lever being adjacent said U-shaped member and operatively engaging same.

6. In means holding a movable element subjected to a force in a selected fixed position and operable to release same and move it to another selected fixed position, the combination comprising: at least one guide member arranged parallel to the axis of movement of said movable element; a load member including a wedge slidably contacting one surface of a guide member and operatively connected to said movable member; an engaging member contacting an oppositely facing surface of a guide member and supporting means operatively cooperating with said wedge member; an operating lever pivoted with respect to the load member and provided with means bearing against the engaging member for movement thereof when said operating lever is pivoted in one direction, and said operating lever and said load carrying member provided with mutually engaging means operative to limit movement of said operating lever when it is pivoted in the other direction; means actuating said operating lever in response to the will of an operator.

7. In means holding a movable element, which is subject to a force, in a selected relatively fixed position and for releasing same and moving it to another selected fixed position, the combination comprising: a load carrying lever pivoted at a point; means operatively associating said movable element with said load lever; a plurality of guide strips arranged along a center line comprising an arc described about said point; said guide strips being in spaced and stacked relationship to each other; a load member contacting one surface of a guide strip in sliding relation thereto and including a wedge, said member being operatively associated with said load carrying lever; a U-shaped member contacting an oppositely facing guide strip surface and holding a roller in operative position with respect to said wedge; a friction plate between two of said guide strips and held against movement independently of said U-shaped member; an operating lever pivoted to said load lever at a point between the guide strip and the pivot point of said load lever; means arresting relative movement between said operating lever and said load lever whereby after limited relative movement said relative movement will cease and the load lever will move integrally with the operating lever; one part of said operating lever engaging said U-shaped member for effecting movement thereof in one direction with respect to said wedge.

8. In means holding in a selected position a relatively movable element subject to a force, and operable to move same to another selected position at the will of an operator, the combination comprising: a load lever pivoted at a relatively stationary point; means operatively associating said relatively movable element with said load lever; a relatively fixed guide member; an operating lever pivotally associated with said load lever; means movable in response to movement of said operating lever cooperating with other means carried by said load lever holding said load lever against movement with respect to said guide member; said means engaging when said operating lever is pivoted in one direction, with respect to said load lever and disengaging when said operating lever is pivoted in the other direction with respect to said load lever; means arresting the relative pivotal movement between the operating lever and the load lever and providing positive engagement therebetween for integral movement thereof.

9. In means holding a movable element subjected to a force in a selected fixed position and operable to release same and move it to another selected fixed position, the combination comprising: a plurality of guide members arranged parallel to the axis of movement of said movable element and in spaced and stacked relation to each other; a load member including a wedge slidably contacting one surface of the guide member and operatively connected to said movable element; a substantially U-shaped member contacting an oppositely faced surface of a guide member and carrying engaging means operatively cooperating with said wedge members; a friction plate between two of said guide members and movable only in consort with movement of said substantially U-shaped member; an operating lever pivoted with respect to the load member and provided with means bearing against said engaging means when said operating lever is pivoted in one direction effecting disengagement thereof, and said operating lever and said load member being provided with mutually engaging means operative to limit movement of said operating lever with respect to the load lever when said operating lever is pivoted in the other direction; means actuating said operating lever in response to the will of an operator.

10. In means for releasably holding in a relatively fixed position a relatively movable element subjected to a load, the combination comprising: a plurality of fixed elongated holding members; a movable load member affixed to said movable element and associated with one of said elongated holding members through mutually contacting friction surfaces; a movable operating member having means at least partially and transversely encircling said elongated holding members and having at least one plate member interposed between two of said elongated holding members and including means responsive to movement of the movable load member relative to the said elongated holding members to apply a force normal to said friction surfaces urging all of said members into frictional engagement with each other; and means responsive to movement of the operating means for progressively releasing said force.

11. In means for releasably holding in relatively fixed selected position a relatively movable element under a loading, the combination comprising: an elongated guide strip; a load member adapted for connection to said movable element and including a wedge having one surface in engagement with said guide strip and an opposite surface inclined thereto; a U-shaped member at least partially and transversely encircling said strip and said wedge member and holding a roller in contact with said inclined surface; whereby movement between said U-shaped member and said inclined surface longitudinally of said guide strips will increase and decrease the degree of frictional engagement of said wedge member with respect to said guide strip.

12. In means for releasably holding in a relatively fixed selected position, relatively movable means subjected to a load, the combination comprising: a relatively fixed elongated guide; a friction member movable with respect to said guide and having a surface inclined with respect to said guide; operating mechanism opposing, and at least partially and transversely encircling, said guide and having means cooperating with said inclined surface to cause frictional engagement between said friction member and said guide member; means attaching said relatively movable means to said friction member and handle means operatively associated with the operating mechanism.

13. In means releasably holding a movable element in relatively fixed position with respect to a guide strip, the combination comprising: a load member slidably contacting a surface of said guide strip, operatively associated with said movable element and having a portion comprising a surface inclined with respect to said guide strip, a member opposing, and at least partially and transversely encircling, said load member and said guide strip, and holding a roller in contact with said inclined surface; and operating means for moving said last mentioned member to effect relative upslope or downslope movement of said roller with respect to said inclined surface.

14. In means for releasably holding in relatively fixed selected position a relatively movable element under a loading, the combination comprising: a relatively fixed elongated guide strip; a wedge member having one surface in engagement with said guide strip and an opposite surface inclined thereto; a U-shaped member partly encircling said strip and said wedge member and holding a roller in contact with said inclined surface, whereby relative movement between said U-shaped member and said inclined surface longitudinally of said guide strip will increase and decrease the degree of frictional engagement of said wedge member and said guide strip; said relatively movable element being connected with one of said members for urging, in response to said load, relative movement between said roller and said wedge in an upslope direction; operating means connected with the other of said members for selectably urging relative movement between said roller and said wedge in a downslope direction; and stop means establishing positive cooperation between said operating means and said relatively movable element immediately after the occurrence of sufficient of such downslope relative movement to effect a predetermined decrease in the frictional engagement between the wedge member and the guide strip.

15. In means holding a movable element subjected to a force in a selected fixed position and releasing same for moving into another selected fixed position at the will of an operator, the combination comprising; a load carrying lever pivoted at a point; means operatively associating said movable element with said load lever; at least one guide strip arranged along a center line comprising an arc described about said point; a member associated with said load lever contacting one surface of a guide strip in sliding relation thereto and including a wedge; a U-shaped member contacting an oppositely facing guide strip surface and holding wedge engaging means in operative position with respect to said wedge; an operating lever pivoted to said load lever at a point between said guide strip and the pivot point of said load lever and operatively engaging said U-shaped member.

RALPH M. HETTINGA.

REFERENCES CITED

The following references are of record in the file of this patent:

UNITED STATES PATENTS

| Number | Name | Date |
|---|---|---|
| 2,114,788 | Tibbetts | Apr. 18, 1938 |
| 1,187,860 | Phelps | June 20, 1916 |
| 1,900,852 | Kuppersmith | Mar. 7, 1933 |
| 2,240,932 | Kinser | May 6, 1941 |
| 2,373,739 | Batterson | Apr. 17, 1939 |
| 1,764,937 | De Bonal | June 17, 1930 |
| 2,205,987 | McCarthy | June 25, 1940 |
| 1,006,028 | Wade | Oct. 17, 1911 |

FOREIGN PATENTS

| Number | Country | Date |
|---|---|---|
| 369,960 | France | Jan. 25, 1907 |
| 396,859 | France | Feb. 6, 1909 |
| 412,269 | France | Apr. 10, 1910 |